INVENTOR
Sven Y. Sternung,
BY
Brown, Jackson, Boettcher & Dienner
ATTYS.

INVENTOR
Sven Y. Sternung,
BY
Brown Jackson Boettcher & Dienner
ATTYS.

INVENTOR
Sven Y. Sternung
BY
Brown, Jackson, Boettcher & Dienner
ATTYS.

INVENTOR
Sven Y. Sternung,
BY Brown, Jackson, Boettcher & Dienner
ATTYS.

INVENTOR
Sven Y. Sternung,
BY
Brown, Jackson, Boettcher & Dienner
ATTYS.

3,458,659
NONBLOCKING PULSE CODE MODULATION SYSTEM HAVING STORAGE AND GATING MEANS WITH COMMON CONTROL

Sven Y. Sternung, Columbus, Ohio, assignor, by mesne assignments, to New North Electric Company, Galion, Ohio, a corporation of Ohio Filed Sept. 15, 1965, Ser. No. 487,393
Int. Cl. H04m 3/08
U.S. Cl. 179—15 7 Claims

ABSTRACT OF THE DISCLOSURE

A nonblocking selective store-transfer-forward switching system serving pulse gate modulation links having incoming and outgoing highways over which multibit characters are transmitted and in which characters arriving over each incoming highway are coupled by first gating means in a cyclic manner to associated incoming storage registers; are transferred in assigned time slots over a nonblocking network which includes first and second highway systems and associated second gating means to designated outgoing storage registers, and are forwarded from the outgoing storage registers in a cyclic manner by third gating means to the outgoing highways. Common control means synchronize and operate the first, second and third gating means in time slots of recurrent frames in the system.

The present invention relates to switching systems and more specifically to a novel switching system for establishing communications between end instruments over pulse code modulation links.

There has been a recent trend, for reasons well known in the art, toward the use of pulse code modulation switching techniques in communication switching networks. Moreover, in certain types of these installations there is a requirement for a so-called nonblocking system in which any call attempted will be completed; that is, there shall be no danger of delay in establishing the desired communication by reason of the nonavailability of a channel from the calling instrument to the desired destination.

In one known type of system an attempt was made to provide a nonblocking arrangement by examining the existing connections whenever a new call is attempted, and if of assistance to the provision of a channel for each existing connection and the new connection being attempted, the system would shuffle the time slots so that the newly attempted connection could be completed. In such shuffle of time slots the failure to receive some of the transmitted characters which represent the information was to be expected. In data transmission, in particular, such losses cannot be tolerated.

It is an object of the present invention therefore to provide a novel nonblocking switching network for PCM links.

It is a specific object to provide such type system in which a nonblocking redundant three stage switching network selectively interconnects storage means at both the incoming and outgoing branches of the PCM links.

It is a further object to present a switching system of such type which includes a redundant switching system between the incoming and outgoing shift registers for the PCM links including a plurality of time division highway means, whereby if all of the highway means of one system are disabled, an alternate highway system remains.

Figure 1:
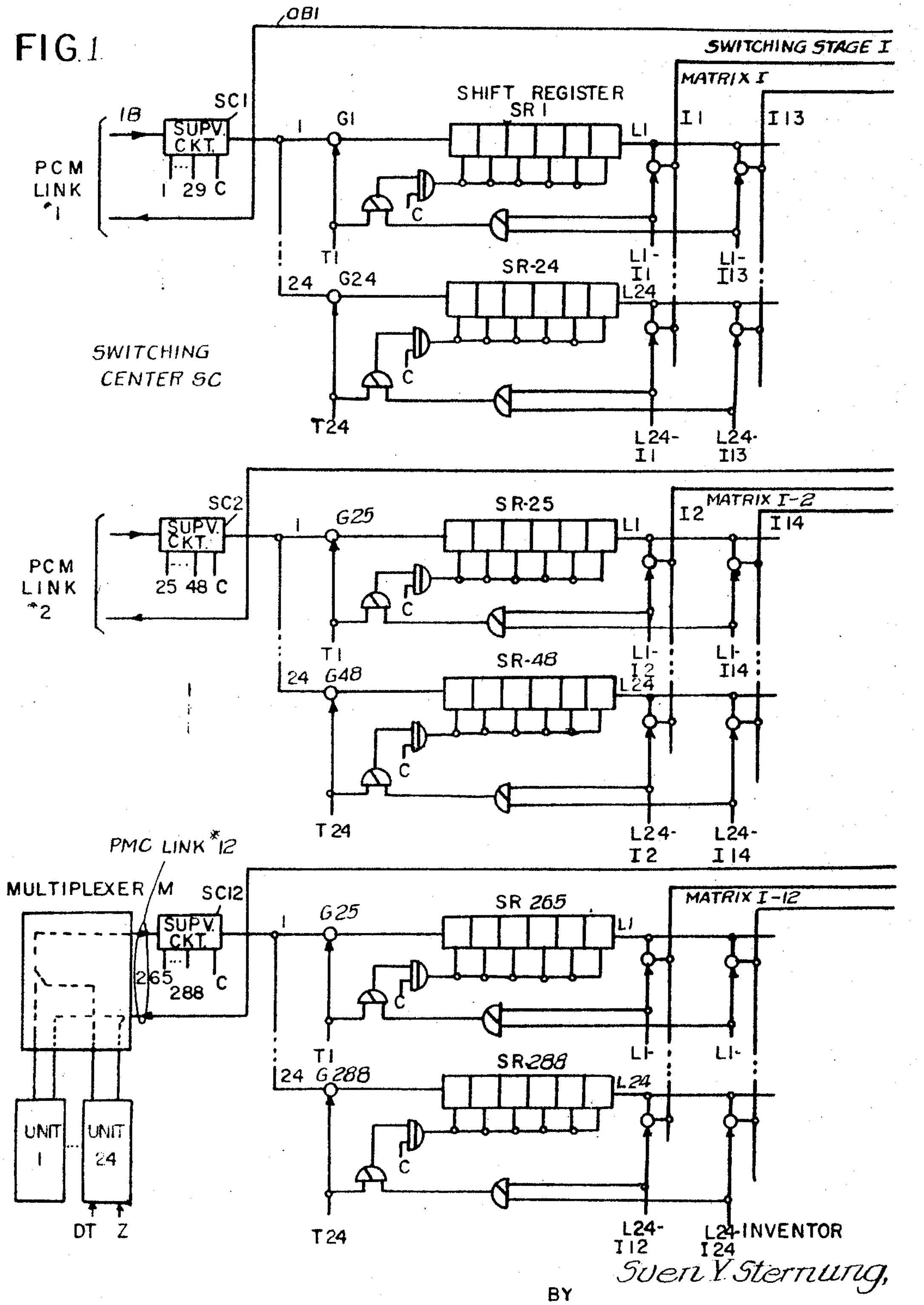
Figure 2:
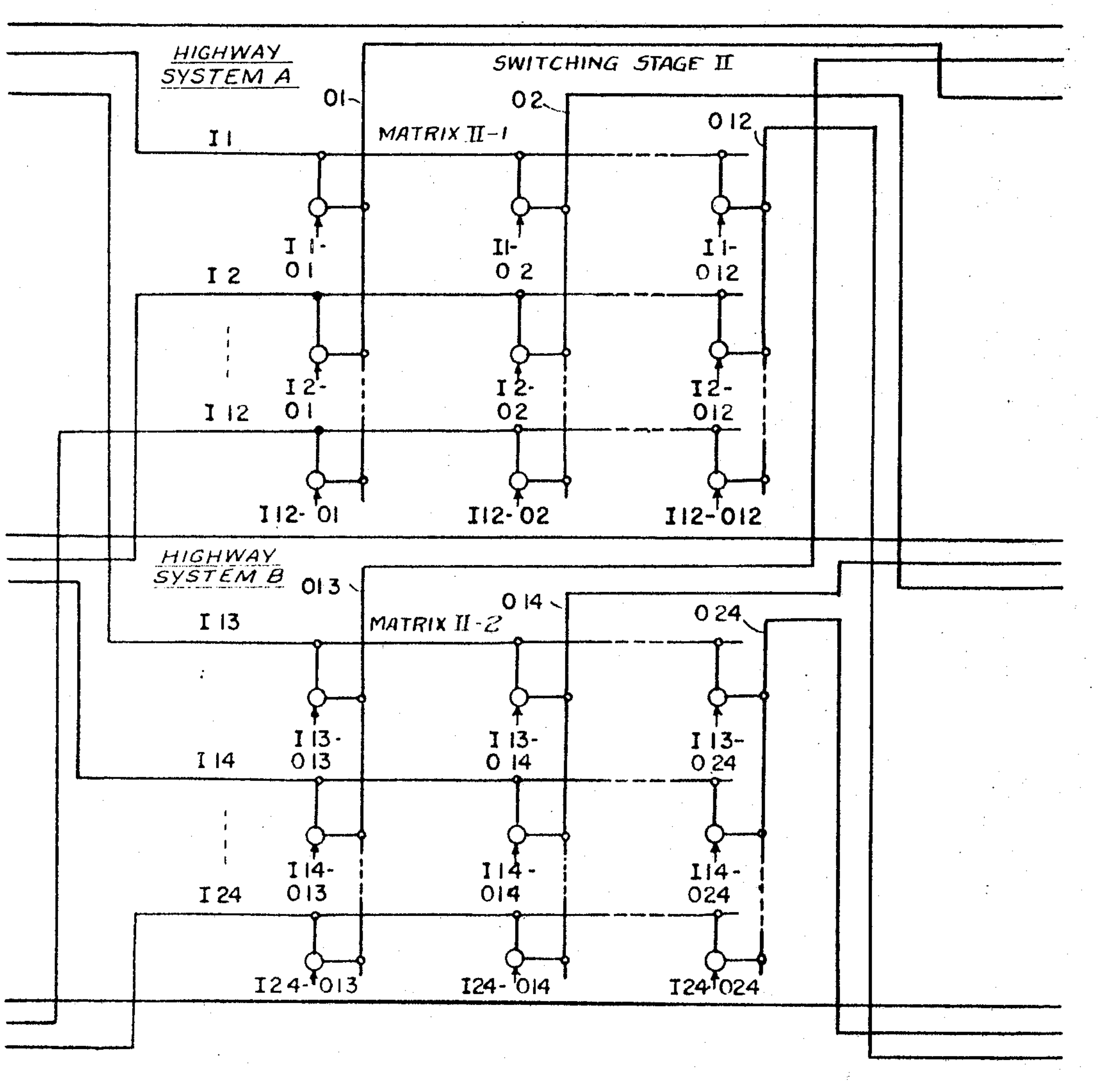
Figure 3:
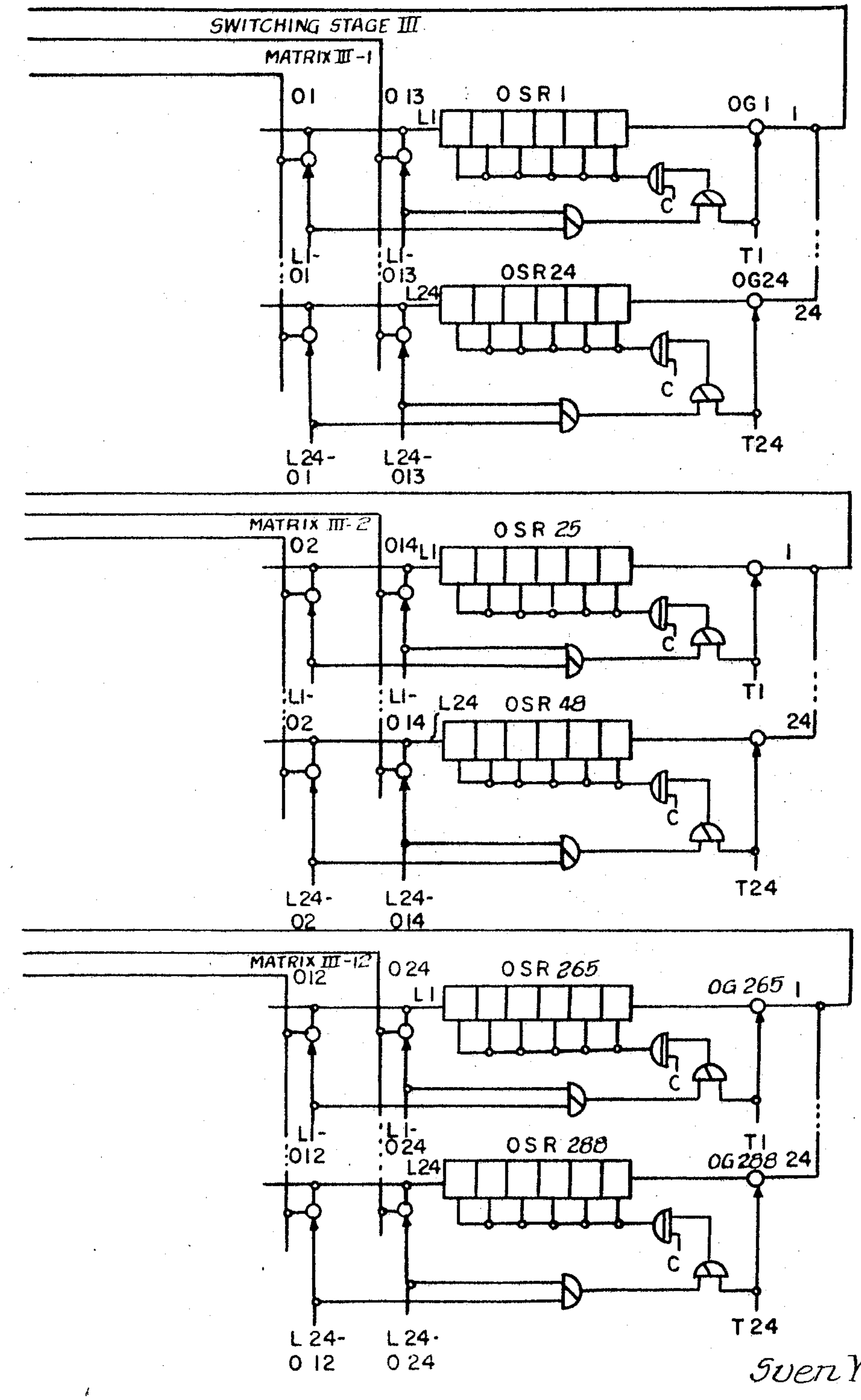
Figure 4:
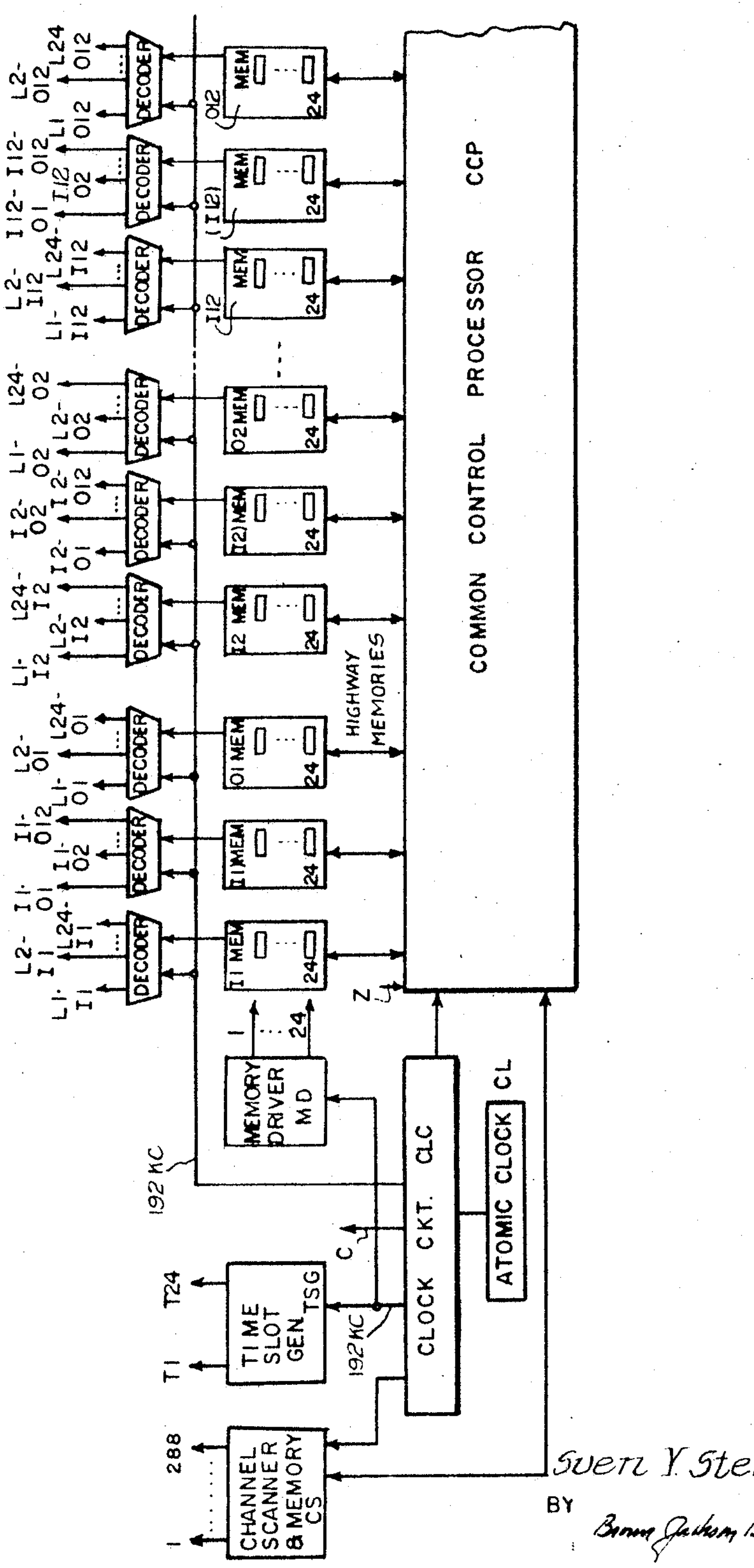
Figure 5:
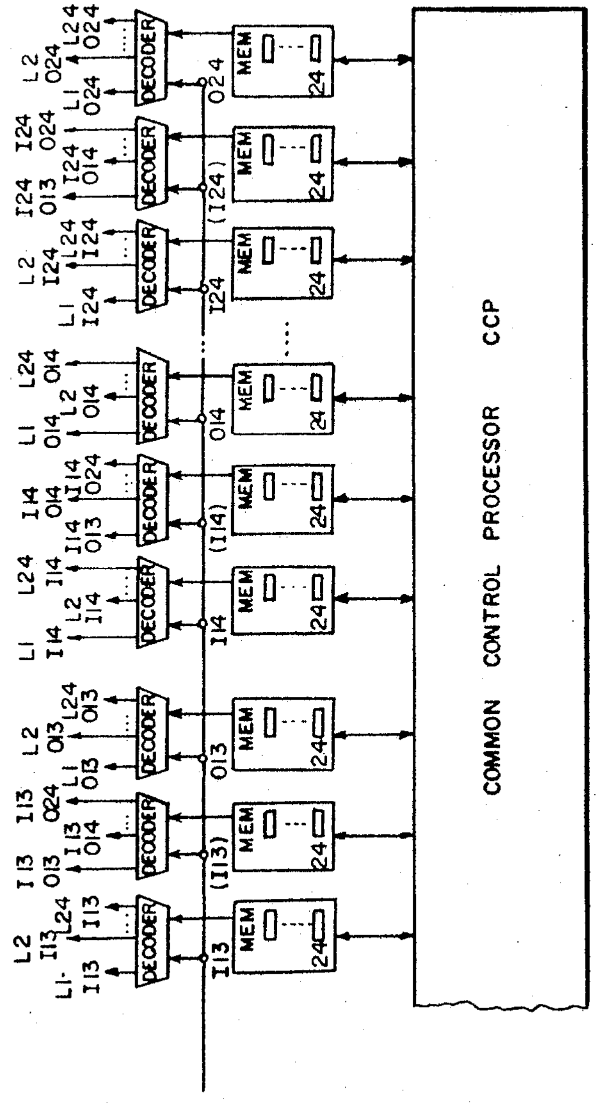

These and other objects, advantages and features of the invention will be apparent to those skilled in the art from the following detailed description, taken in conjunction with the acompanying drawings, in which:

FIGURES 1–3 illustrate a plurality of PCM links and interconnecting three stage switching network; and FIGURES 4 and 5 illustrate control circuitry for monitoring the PCM links and controlling the gates of the switching network of FIGURES 1–3 for establishing connection therebetween.

GENERAL DESCRIPTION

Referring to FIGURES 1–3, there are shown twelve PCM links with incoming and outgoing branches thereof which may extend between the illustrated switching center SC (FIGURES 1–5) and switching equipment at the remote locations (not shown). PCM link #1, for example, has an incoming branch 1B which may comprise an incoming, time-divided highway having twenty-four time slots to accommodate twenty-four PCM characters. Each character may be comprised of a plurality of PCM bits, the arrangement of the present disclosure including, for purpose of illustration, only six information bits and at least one switching bit.

The incoming branch 1B of PCM link 1 is connected over a supervisory circuit SC1 to twenty-four gates, G1–G24 controlled by twenty-four signal inputs T1–T24 which are cyclically energized to distribute the twenty-four characters incoming on the time slot of the highway to twenty-four shift register memories SR1–SR24. The shift registers SR1–SR24 for the first PCM link #1 have outputs L1–L24 which are connected as inputs to the switching stage I of a switching network having switching stages I, II, III.

The output branch OB1 of PCM link #1 is connected via twenty-four gates OG1–OG24 respectively to twenty-four shift registers OSR1–OSR24 which have inputs L1–L24 from switching stage III of the three stage switching network. As will be shown, the time slot generator TSG (FIGURE 4) supplies signals to inputs T1–T24 (FIGURE 3) in a cyclic manner to control gates OG1–OG24 to distribute the twenty-four PCM characters on the shift registers OSR1–OSR24 over branch OB1 to the PCM link #1. Leads T1–T24 (FIGURE 1) for the shift registers SR1–SR24 are energized by the same signals to effect readin of PCM characters into shift registers SR1–SR24 as will be shown.

The switching network is divided into three stages I, II, III. The first switching stage includes twelve matrices I–I12, each of which has twenty-four inputs (i.e. "*n*" inputs) such as L1–L24 connected to incoming shift register memories, such as SR1–SR24, and at least 2*n*–1 outputs via highways I1, I13, etc., to the two matrices of the second stage II. Connection between the inputs, such as L1–L24 and the highways, such as I1, I13 of a matrix such as matrix I–1 in the first switching stage is effected by gates at junctions, such as L1–I1 and L1–I13.

The third switching stage III has twelve matrices III–1 through III–12. Each matrix, such as matrix III–1 includes at least 2*n*—1 inputs via highway 01, 013 from the second switching stage II, and twenty-four outputs L1–L24 (i.e. "*n*" outputs) to twenty-four outgoing shift registers, such as OSR1–OSR24. Connections between the input highways, such as 01, 013 and the outputs, such as L1–L24, for a matrix, such as III–1, are effected by gates at junctions L1–01 and L1–013. The second or intermediate switching stage includes two switching matrices for switching PCM characters from the first stage to the third stage. As will be shown, such switching is accomplished over a redundant set of highway systems A and B, system A comprising matrix II–1 (incoming highways I1–I12 and outgoing highways 01–012 with interconnecting gates I1–01 through I12–012) and the B system comprising matrix II–2 (incoming highways I13–I24 and outgoing highways 013–024 with interconnecting gates I13–013 through I24–024.

A common control processor CCP (FIG. 4) with a plurality of sets of highway memories, such as the set I1 (I1), 01, and their associated decodes is provided to control the operation of all gates of the three stage switching networks I–III. The information in a memory, such as I1, indicates whether or not a transfer is to be effected by one of the gates controlled via conductors L1–L1, etc., of its associated decoder as the successive time slots occur. That is, each memory has its own decoder shown immediately thereabove (FIGURES 4 and 5), and each memory and decoder control the gates in the three switching stages which are identified by the legends appearing above the decoder.

In case a transfer is to take place, the entire transfer path is written into the memories by the common control processor. That is, there is highway memory such as I1 MEM (FIG. 4) for each incoming highway, such as I1 (FIG. 1) to control connections via inputs L1–L24 from the associated shift registers SR1–SR24; another memory, such as (I1) MEM (FIG. 4) for each incoming highway, such as I1 (FIG. 1) to control connections (FIG. 2) from the incoming highway, such as I1 to each outgoing highway, such as 01–012 accessible thereto, and a memory for each outgoing highway, such as 01 MEM (FIG. 4) to control connections (FIG. 3) outgoing from highway 01 to L1–L24 and the output shift registers, such as OSR1–OSR24.

The I1 MEM for incoming highway I1 may comprise a word-oriented core memory having five elements giving $2^5$ combinations of which twenty-four are used. The (I1) MEM incoming highway I1 may comprise a word-oriented core memory having four elements giving $2^4$ combinations, of which twelve are used. The 01 MEM for outgoing highway 01 may comprise a word-oriented core memory having five elements giving $2^5$ combinations of which twenty-four are used. The other highway memories are similarly organized. The memory driver MD at the various positions of its scan causes readout of the associated submemories of the highway memory circuits.

By way of a specific example, if transfer is to take place from the first incoming shift register SR1 of incoming PCM link #1 to the twenty-fourth outgoing shift registers OSR 288 associated with the outgoing branch of PCM link #12 over the A highway system, the gates associated with conductors L1–I1, I1–012, L24–012 would be actuated.

Thus, the first designation L1–I1 indicates which character is to be transferred and the highway over which the transfer is to take place. The second designation I1–012 indicates the gate at a crosspoint in the second switching stage which is to be operated. The third designation L24–012 indicates the outgoing shift register in which the transfered character is to be stored. By operating the gates in such manner, a PCM character can be transferred from an incoming character memory shift register, such as SR1, to an outgoing character memory shift register, such as OSR 288. If these gates are activated in time slot #1, for example, of every frame, a continuous transfer of the PCM information received over the incoming branch of PCM link #1 is accomplished.

Furthermore, it can also be seen that two transfer channels exist from any incoming character memory register, such as SR1, via two gates, such as L1–I1, L1–I13, which have access to a highway I1, I13 respectively of each of the systems A and B. Hence each input, such as L1, has access to forty-eight transfer channels since the two highways such as I1 and I13, of the two systems A and B have twenty-four time slots each.

The reason for providing twice as many output channels from each matrix in the first stage as there are inputs thereto is to achieve a non-blocking system. For a non-blocking, three-stage switching network in which a matrix of the first switching stage has $n$ inputs, there shall be provided at least $2n-1$ outputs. Also, if $n$ is the output of each matrix of the third switching stage, there shall also at least $2n-1$ inputs thereto.

CONTROLS

Referring now to the control (FIGURES 4 and 5) there will be seen an atomic clock CL driving a clock circuit CLC which in turn controls a common control processor CCP, a channel scanner CS, a time slot generator TSG, a memory driver MD (which in turn drives the memories), and the decoders associated with the memories. The clock CL also provides a clock drive signal "$c$" to all points so labeled.

The channel scanner CS constantly scans the 1 . . . 288 points assoicated with the twelve supervision circuits SC1–SC12 (FIG. 2), each supervision circuit having twenty-four points (i.e., 1–24, 25–48, etc.) which are arranged to be scanned to thus provide a total of 288 scanning points.

The time slot generator TSG continuously generates twenty-four time slots T1–T24 which coincide with the time slots on the input branches of the PCM links (i.e., the twenty-four PCM characters which are associated with twenty-four time divided messages on the various PCM links). The outputs T1–T24 of the time slot generator TSG serve all correspondingly labeled points of the drawing. For example, when the time slot generator is energizing conductor T1, the gates, such as G1, OG1 connected to conductor T1 will be made to conduct. When the time slot generator is energizing conductor T24, the gates, such as G24, OG24 etc., connected to conductor T24 will be made to conduct. Each of the conductors T1–T24 is energized at an 8 kc. rate.

The channel scanner CS also has memory facilities for "remembering" the prior condition of each of the 1–288 points scanned.

The memory driver MD continuously drives the twenty-four memories of each highway memory, such as I1 memory etc., each memory being driven at the 8 kc. rate in synchronism with the conductors T1–T24. The channel scanner CS has two-way communication with the common control processor CCP. Also, the highway memories driven by memory drive MD each have two-way communication with the common control processor CCP, whereby the common control processor (CCP) sets the various memories in the highway memory circuits so that as the memory driver MD scans these memories, signals output from the memories will control the associated decoders to selectively operate the ones of the gates in the switching matrices indicated by the memory to be operated in the different time slots.

The clock circuit CLC provides a 192 k.c. signal to each of the decoders, enabling the decoders to operate the gates at precisely the correct times regardless of slight delays in the common control processor CCP highway memories IL, etc.; and associated decoders.

DETAILED DESCRIPTION

Considering again the twelve PCM links, the first eleven PCM links #1–#11 for illustration may be considered links incoming from remote locations. It should be noted that the illustrated system, and the system at the other end of the PCM links 1–11 are kept in synchronism by atomic clocks which are synchronized with each other. However, varying lengths of the PCM links may introduce varying delays, and accordingly the supervisory circuits, such as SC1, contain delay adjustment means to bring about synchronization of characters so that the characters synchronize with the time slots of T1–T24 which also synchronize with the signals which operate the gates of the three switching stages I, II, III.

The twelfth PCM link may be connected to a multiplexer M which in turn is connected to units 1–24, the first twelve of which may be considered to be local end instruments, and the last twelve of which may be considered to be registers, etc.

It is now assumed for illustration purposes, that a call is incoming over PCM link #1 in time slot 1 (i.e., character 1) and that the calling party dials the number of the called party associated with the time slot 1 of PCM link #2. It will be recalled that in the present embodiment, each PCM character which occurs during a time slot was assumed to comprise a plurality of six information bits, and additionally at least one signalling bit. Accordingly, six shift register stages are shown in FIGURE 1 for the purpose of storing the six information bits.

Assuming that the signalling bit is logic 1 for "off-hook" and logic 0 for "on-hook," as the signalling bit logic 1 appears in time slot 1 of PCM link 1, as a result of the calling station associated with character 1 going "off-hook," the supervisory circuit SC1 detects the same and so indicates on its scanning lead 1 of leads 1–24, whereby channel scanner CS detects the same when it scans lead 1 of leads 1–288.

Knowing by means of its memory facilities that an "on-hook" condition previously existed on lead 1 of leads 1–288, the channel scanner CS notifies the common control processor CCP. It should be appreciated that the channel scanner CS also keeps itself updated in its memory as to the status of the registers, etc. of units 13–24 of PCM link 12 and continuously keeps the common control processor CCP apprised thereof. The common control processor CCP thereupon stores information in the highway memories to set up a connection between character 1 of PCM link 1 and an idle register, such as the register unit 24 associated with character 24 of PCM link #12.

As has been stated, the incoming call carried by the character of time slot 1 of PCM link 1 is detected by the superivsory circuit SC1 which extends a signal on lead 1, and the channel scanner CS, which has a memory for remembering the prior state of character 1, detects such signal.

The channel scanner CS advises the common control processor CCP, as to the idle and busy condition of the registers, etc. of units 13–24 of PCM link 12. It should be appreciated that each of the units 1–24 of PCM link 12 keep the associated supervisory circuit SC12 advised via the multiplexer M as to their condition by means of the preliminary signalling bit previously mentioned which is a part of each character.

Thereupon the common control processor CCP assigns an idle register to the call (which is assumed to be register unit 24 of PCM link 12 in the present example); assigns an idle time slot, such as time slot #10, for example for use in switching the connection over the second switching stage; and sets the highway memory circuits, so that the calling party will receive dial tone from the register of unit 24 of PCM link 12 as follows:

(1) CCP sets the #10 submemory (not shown) but indicated by the dots between I1, I24 in highway memory I12) to the L24 position, which via the associated decoder energizes lead L24–I12 every time the memory driver MD reaches the tenth position in its drive to thus operate gate L24–I12.

(2) Sets the #10 submemory of highway memory (I12) to the 01 position which, via the assoicated decoder, energizes lead I12–01 every time the memory driver reaches the tenth position in its drive, thus operating gate I12–01.

(3) Sets the #10 submemory of highway memory 01 to the L1 position, which via the associated decoder energizes lead L1–01 every time the memory driver reaches the tenth position in its drive, thus operating gate L1–01.

More specifically, dial tone via unit 24 of PCM link #12 to the multiplexer M causes the dial tone signal to be present as character 24 of PCM link #12. When the time slot generator TSG energizes lead T24 the associated gate G288 is caused to conduct. Simultaneously, the signal on lead 24 through the associated OR gate acts as an input to the associated AND gate. During time slot 24, successive signals on the clock lead C cause the AND circuit to give shift signals to the associated memory shift register SR288 which brings the bits of character 24 into register SR288. Thus, six clock signals must occur during a time slot.

In the present example, the dial tone signal thus stored in shift register SR288 is transferred over the established connection during time slot 10 of the next frame gates L24–I12, I12–01, and L1–01 being operated by the decoders connected to the highway memories I12, (I12), 01. The signal on lead L24–I12 during the time slot 10 via associated OR gates acts as an input to the associated AND gate for shift register 288. In a similar manner, the signal on lead L1–01 during the tenth time slot via associated OR gate acts as an input to the associated AND gate for output shift register OSR1. Ensuing clock pulses over conductor C during the gating provided in such manner during the tenth time slot cause the bits to be transferred from the shaft register memory 288 to the shift register memory OSR1. During time slot 24 of the same frame, character 24 will be reloaded into the shift register memory SR288.

During time slot 1 of the next frame, the signal on lead T1 causes the character in the shift register memory OSR1 to be shifted out over the outgoing branch of PCM link #1. This occurs repeatedly to give the calling party dial tone.

Thereupon the calling party dials the called number. In similar fashion to that which has been described, during the signal on lead T1, the first character on PCM link #1 will be brought into associated shift register SR1 on the incoming branch via supervisory circuit SC1. During the tenth time slot, for example, gates L1–I1, I1–012, and L24–012 will be operated, transferring the stored character into the shift register OSR288 of PCM link 12.

During the signal on lead T24, the character stored in the shift register OSR288 associated with PCM link #12 will be shifted via the multiplexer M into the register unit 24.

This character transmission occurs repeatedly over the connection described as the first digit of the called number is dialed. Upon receiving the first digit dialed, the register unit 24 stops the transmission of dial tone. When all digits of the called number have been dialed and translated in a like manner, the register unit 24 signals the common control processor CCP via path Z, and transmits the called number thereto. Control processor CCP retains the identity of the calling party, discontinues the connections between the calling party and register unit 24, and proceeds to set up a ringing connection to the called party, and a ring-back connection to the calling party by means of other units of the group 13–24 as would be understood by those skilled in the art.

When the called party answers the scanner CS detects the same and signals the control processor thereof which discontinues the ringing and ring-back connections, and proceeds to set up connections between the calling and called parties, it being assumed that the called party is associated with character 1 on the incoming and outgoing branches of PCM link #2.

More specifically, a character 1 from the incoming branch of PCM link #1 is stored during T1 in register SR1. This character may be transferred to shift register OSR25 by operation of gates L1–I1, I1–02, L1–02 during the tenth time slot, for example, into outgoing shift-register OSR25 of PCM link #2. When lead T1 is energized during the next frame, the character stored in OSR25 is sent via the associated gate OG25 to the outgoing branch of PCM link #2. This process repeats many times to afford communication from the calling party associated with character 1 of PCM link #1 to the called party associated with character 1 of PCM link #2.

In a similar manner, a character 1 of PCM link 2 is stored in shift register SR25 as the result of a signal over T1 during time slot T1 for example. This character may be transferred from shift register SR25 to shift register OSR1 by operation of gates L1–I2, I2–01, and L1–01 during the tenth time slot (or such other time slot as may be available) to outgoing shift register OSR1.

When lead T1 is energized during the next frame, the character stored in OSR1 is sent via the associated gate 0G1 to the outgoing branch of PCM link #1. At this time, two way communication between the end instruments associated with character 1 of PCM link #1 and with character 1 of PCM link #2 is established.

It should be appreciated that in effecting the assignment of time slots in such manner, the common control processor CCP contains memory equipment which keeps tally of the status of the time slots of each highway and, in effecting communication, selects an idle time slot common to an incoming and an outgoing highway.

An "on-hook" condition at either end occasioned by "hang-up" will be detected by channel scanner CS, and as a result thereof the two way communication connection will be discontinued, and busy tone (not shown) will be projected to the end instrument in the "off-hook" condition until such time as "hang-up" occurs thereat.

In operation of the system it will be found that no character delay, one character delay, and two character delay may occur as exemplified by the following examples.

Case 1 (No character delay)

(a) Incoming call in time slot 1.
(b) Office assigns transfer in time slot 10.
(c) Destination in time slot 24.

Case 2 (one character delay will result)

(a) Incoming call in time slot 1.
(b) Office assigns transfer in time slot 1.
(c) Destination in time slot 24.

Case 3 (two character delay)

(a) Incoming call in time slot 1.
(b) Office assigns transfer in time slot 1.
(c) Destination in time slot 1.

SUMMARY

In a PCM system it is necessary in the achievement of reliable transmission of information to prevent even a momentary interruption of an established connection which is being used in the transmission of information, and the consequent loss of characters. As noted above, such loss, particularly in the case of data transmission, cannot be tolerated.

The above described redundant, nonblocking system provides such manner of transmission. That is, by the use of a redundant switching network in the manner described, a sufficient number of switching channels with a reduced number of contacts is provided to achieve the desired nonblocking arrangement. Additionally, the provision of a nonblocking system obviates the need for shifting time slots, and thereby prevents character loss, such as may occur in known systems in which time slots in the switching matrix are shuffled in an attempt to achieve a nonblocking arrangement. Further, with duplicate highway systems, alternate routes are provided so that with twenty-four lines connected to the switches of the matrices of the first and third stages, and twice that number of connections connected to the matrices of the second stage, non-blocking is achieved. If per chance, a highway of one of the systems is disabled, the system redundancy affords a means of maintaining service even if some blocking is encountered.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. A switching system for selectively establishing communications between pulse code modulation links, each of which links has an incoming highway and an outgoing highway which during each of a plurality of time slots in a recurrent frame transmits multibit pulse code modulation characters as required, a plurality of "$n$" incoming storage means for each incoming highway, the number "$n$" of said incoming storage means being equal to at least the number of character time slots of a frame on said highway, each incoming storage means having means for storing predetermined bits of a character, common control means for providing time slots for the system in a recurrent frame, first gating means controlled by said common control means for loading the bits of each successive character on one of said incoming highways into the successive ones of said plurality of incoming storage means for said one highway during successive ones of said time slots, a plurality of "$n$" outgoing storage means for each outgoing highway, each of which outgoing storage means has means for storing a predetermined plurality of the bits of a character; a multistage, non-blocking switching network comprising a first switching stage including a plurality of matrices, each of which has at least $2n-1$ inputs connected to the "$n$" outputs of said "$n$" incoming storage means and at least $2n-1$ outputs, a second switching stage including at least $2n-1$ inputs from each matrix of said first switching stage, and a third switching stage which includes a plurality of matrices, each of which has at least $2n-1$ inputs connected to the output of said second switching stage, and at least $2n-1$ outputs connected to an "$n$" number of said outgoing storage means, second gating means controlled by said common control means for selectively transferring characters stored in one of said incoming storage means over said switching stages to a designated one of said outgoing storage means in an available one of said time slots, and third gating means controlled by said common control means for transmitting characters stored in said outgoing storage means for each outgoing highway during successive ones of said time slots over the associated one of said pulse code modulating links.

2. A switching system as set forth in claim 1 in which said common control means is operative at times to assign a time slot to operate said second gating means in said nonblocking network which is in the same frame as said time slot which operates said first gating means in the loading of said incoming storage means.

3. A switching system as set forth in claim 1 in which said common control means is operative at times to assign a time slot for unloading said outgoing storage means which is in the same frame as said time slot which loads said incoming storage means.

4. A system as set forth in claim 1 in which said common control means includes memory means for storing the identity of the entire transfer path selected for said transfer of said character from said one incoming storage means over said switching network to said outgoing storage means.

5. A system as set forth in claim 1 in which said multistage nonblocking network comprises two highway systems in which each matrix of the first stage has a plurality of input lines and two output highways and each matrix of the third stage has two input highways and a plurality of output lines, and the second stage has two matrices each of which has an input highway from each matrix of the first stage and an output highway to each matrix of the third stage.

6. A system as set forth in claim 1 in which said common control means provides identical time slots in successive frames for respectively loading a character on the incoming highways of a link into the associated one of the incoming storage means, transferring said character over said switching network to one of said outgoing storage means, and unloading said character from the outgoing storage means to the associated outgoing highway.

7. A system as set forth in claim 1 in which said multibit character includes at least one bit having one logic signal to identify an off-hook condition and a different logic signal to identify an on-hook condition, and which includes a supervisory circuit for each incoming highway of a pulse code modulation link which is operative to detect said logic signals, and scanning means for continually scanning said supervisory circuits to detect on-hook and off-hook conditions indicated by the different characters for use in establishing connections over the switching network.

References Cited

UNITED STATES PATENTS

| | | | |
|---|---|---|---|
| 3,129,407 | 4/1964 | Paull | 340—147 |
| 3,134,856 | 5/1964 | Jorgensen | 179—15 |
| 3,028,581 | 4/1962 | Thorpe | 340—166 |
| 3,291,914 | 12/1966 | Bowers | 179—18 |
| 3,336,443 | 8/1967 | Benmussa et al. | 179—22 |
| 3,172,956 | 3/1965 | Inose et al. | 179—15 |
| 3,201,520 | 8/1965 | Bereznak | 179—15 |
| 3,205,312 | 9/1965 | Brightman et al. | 179—15 |
| 3,263,030 | 7/1966 | Stiefel et al. | 179—15 |

ROBERT L. GRIFFIN, Primary Examiner

CARL R. VON HELLENS, Assistant Examiner

U.S. Cl. X.R.

179—18; 340—147, 166